(12) United States Patent
Fons et al.

(10) Patent No.: US 10,664,413 B2
(45) Date of Patent: May 26, 2020

(54) HARDWARE SECURITY FOR AN ELECTRONIC CONTROL UNIT

(71) Applicant: Lear Corporation, Southfield, MI (US)

(72) Inventors: Francisco Fons, Valls (ES); Mariano Fons, Valls (ES); Jose Gabriel Fernandez Banares, Valls (ES)

(73) Assignee: LEAR CORPORATION, Southfield, MI (US)

( * ) Notice: Subject to any disclaimer, the term of this patent is extended or adjusted under 35 U.S.C. 154(b) by 151 days.

(21) Appl. No.: 15/418,061

(22) Filed: Jan. 27, 2017

(65) Prior Publication Data
US 2018/0217942 A1   Aug. 2, 2018

(51) Int. Cl.
*G06F 12/14* (2006.01)
*H04L 9/16* (2006.01)
*H04L 9/12* (2006.01)

(52) U.S. Cl.
CPC ............ *G06F 12/1408* (2013.01); *H04L 9/12* (2013.01); *H04L 9/16* (2013.01); *G06F 2212/1052* (2013.01); *H04L 2209/84* (2013.01)

(58) Field of Classification Search
CPC .... G06F 12/1408; G06F 12/305; G06F 12/31; G06F 12/575; G06F 2221/2103;
(Continued)

(56) References Cited

U.S. PATENT DOCUMENTS 2,884,520 A * 4/1959 Ray Lambert ........... H04B 1/12
                                                        455/286
5,323,315 A * 6/1994 Highbloom .......... G06Q 40/025
                                                        235/379
(Continued)

FOREIGN PATENT DOCUMENTS

CN         1738242 A     2/2006
CN         1908833 A     2/2007
(Continued)

OTHER PUBLICATIONS

"A PUF-FSM Binding Scheme for FPGA IP Protection and Pay-Per-Device Licensing", Zhang, Jiliang, et al. (IEEE Transactions on Information Forensics and Security, vol. 10, No. 6, Jun. 2015, hereinafter Zhang) (Year: 2015 ).*
(Continued)

*Primary Examiner* — Farid Homayounmehr
*Assistant Examiner* — Raied A Salman
(74) *Attorney, Agent, or Firm* — Brooks Kushman P.C.

(57) ABSTRACT

An electronic control unit (ECU) for vehicles is described, including memory to store encrypted data and unencrypted data; a main control unit operatively connected to memory to access unencrypted data; and a hardware encryption-decryption device operatively connected to memory to access encrypted/decrypted data for decryption using a hardware algorithm and for encryption using a hardware algorithm. Data in the memory is decrypted by the hardware encryption-decryption device using the hardware algorithm and stored in memory for use by the main control unit. Data in memory is encrypted by the hardware encryption-decryption device using the hardware algorithm for storage in memory. The main control unit and the hardware encryption-decryption device are separate integrate circuits on a same substrate or SOC and are connected by a bus and can process data in parallel. An external bus can communicate encrypted information with the ECU to allow encrypt/decrypt at run time (on-the-fly) and wire-speed.

25 Claims, 9 Drawing Sheets

(58) Field of Classification Search
CPC . G06F 2221/2129; G06F 19/00; G06K 17/00; G07C 5/00; G07C 5/08; H04W 12/04; H04W 12/06; H04W 52/244; H04W 52/42; H04W 84/005; H04W 84/045; H04L 63/0442; H04L 63/0823; H04L 63/061; H04L 2209/84; H04L 9/3236; H04L 9/3247; H04L 9/3006; H04B 7/0408; H04B 7/155; H04B 7/10; B60R 16/02; B62D 41/00
USPC ................. 713/190, 194, 189; 701/23, 33.4; 340/572.1; 726/26

See application file for complete search history.

(56) References Cited

U.S. PATENT DOCUMENTS

| | | | | |
|---|---|---|---|---|
| 5,742,677 | A * | 4/1998 | Pinder | H04L 63/0428 348/E5.004 |
| 5,995,623 | A * | 11/1999 | Kawano | G06F 21/10 380/277 |
| 7,757,294 | B1 * | 7/2010 | Simkins | G06F 21/10 726/26 |
| 7,940,932 | B2 | 5/2011 | Paksoy et al. | |
| 8,188,860 | B2 | 5/2012 | Haid | |
| 8,683,233 | B2 | 3/2014 | Feilen et al. | |
| 8,923,514 | B2 | 12/2014 | Weghaus | |
| 8,938,614 | B2 | 1/2015 | Fischer et al. | |
| 9,246,671 | B2 | 1/2016 | Brahner et al. | |
| 2002/0094086 | A1 | 7/2002 | Grassmann et al. | |
| 2002/0183905 | A1 * | 12/2002 | Maeda | B62D 41/00 701/33.4 |
| 2004/0193764 | A1 | 9/2004 | Watanabe | |
| 2006/0155439 | A1 * | 7/2006 | Slawinski | G07C 5/0858 701/33.4 |
| 2007/0069921 | A1 * | 3/2007 | Sefton | G08G 1/0175 340/932.2 |
| 2007/0118752 | A1 * | 5/2007 | Kiessling | G06F 21/305 713/176 |
| 2008/0192929 | A1 | 8/2008 | Knechtel et al. | |
| 2009/0022317 | A1 | 1/2009 | Akima et al. | |
| 2010/0100749 | A1 | 4/2010 | Gerber et al. | |
| 2010/0185843 | A1 | 7/2010 | Olarig et al. | |
| 2010/0234071 | A1 * | 9/2010 | Shabtay | H04B 7/0408 455/562.1 |
| 2013/0230173 | A1 * | 9/2013 | Hori | G08G 1/092 380/281 |
| 2013/0261839 | A1 * | 10/2013 | Meyer | G07C 5/0808 701/1 |
| 2014/0016781 | A1 | 1/2014 | Geiger et al. | |
| 2014/0025964 | A1 | 1/2014 | Hui et al. | |
| 2014/0032916 | A1 * | 1/2014 | Costin | H04L 9/3236 713/176 |
| 2014/0201126 | A1 * | 7/2014 | Zadeh | G06K 9/627 706/52 |
| 2014/0210646 | A1 * | 7/2014 | Subramanya | B61L 29/28 340/928 |
| 2015/0065055 | A1 * | 3/2015 | Newham | H04W 52/0251 455/41.3 |
| 2015/0179033 | A1 * | 6/2015 | Birk | G08B 13/1427 340/572.1 |
| 2015/0331422 | A1 * | 11/2015 | Hartung | G05D 1/021 701/23 |
| 2015/0334113 | A1 * | 11/2015 | Angus | H04L 63/0428 713/168 |
| 2016/0078253 | A1 * | 3/2016 | Frank | G06F 21/79 726/26 |
| 2017/0147356 | A1 * | 5/2017 | Kotary | G06F 21/575 |
| 2017/0193026 | A1 * | 7/2017 | Pettovello | G06F 12/1408 |
| 2017/0244565 | A1 * | 8/2017 | Bronk | H04L 63/126 |
| 2017/0352215 | A1 * | 12/2017 | Maiwand | G07C 9/00896 |
| 2018/0013723 | A1 * | 1/2018 | Kirk | H04L 63/0272 |
| 2018/0084412 | A1 * | 3/2018 | Alfred | H04L 63/0442 |

FOREIGN PATENT DOCUMENTS

| | | | | |
|---|---|---|---|---|
| CN | 101477612 | A | * | 1/2008 |
| CN | 101350725 | A | | 1/2009 |
| CN | 101477612 | A | * | 9/2009 |
| CN | 101559745 | A | | 10/2009 |
| CN | 202453947 | U | * | 9/2012 |
| CN | 103287359 | A | | 9/2013 |
| CN | 205334222 | U | | 6/2016 |
| DE | 102013227184 | A1 | * | 12/2013 ........... H04L 9/3006 |

OTHER PUBLICATIONS

"FPGA-Based Design for Low System Power Consumption", Arora, Prem (https://www.powerelectronics.com/power-electronics-systenns/fpga-based-design-low-system-powerconsumption, Apr. 7, 2016, hereinafter Arora) (Year: 2016).*

Arora, Prem, "FPGA-Based Design for Low System Power Consumption", 2016, https://www.powerelectronics.com/power-electronics-systems/fpga-based-design-low-system-powerconsumption, pp. 1-8.*

Raghu M E et al., Application of Classical Encryption Techniques for Securing Data—A Threaded Approach, Apr. 2015, International Journal on Cybernetics & Informatics (IJCI) vol. 4, No. 2, Apr. 2015, pp. 125-132.*

Zhang, Jiliang, "A PUF-FSM Binding Scheme for FPGA IP Protection and Pay-Per-Device Licensing", UNE 2015, IEEE Transactions on Information Forensics and Security, vol. 10, No. 6, pp. 1-15.*

Yinglei Wang, et al., Flash Memory for Ubiquitous Hardware Security Functions: True Random Number Generation and Device Fingerprints, May 2012, 2012 IEEE Symposium on Security and Privacy, pp. 1-15.*

Besenbruch, D., "Making networks more secure", NXP Semiconductors, Jan. 2014, 6 pgs.

Shreejith, S. et al., "Zero Latency Encryption with FPGAs for Secure Time-Triggered Automotive Networks", Nanyang Technological University, 2014, pp. 256-259.

Soja, R., "Automotive Security: From Standards to Implementation", Jan. 2014, 18 pgs.

The State Intellectual Property Office of People's Republic of China, First Office Action for Chinese Patent Application No. 201710953368.3, dated Mar. 26, 2020.

1st Chinese Office Action, English Translation.

CN1738242A, English Abstract and Machine Translation.

CN1908833A, English Abstract and Machine Translation.

CN101350725A, English Abstract abd U.S. Equivalent U.S. Pub. No. 2008/0192929.

CN101559745A, English Abstract and Machine Translation.

CN103287359A, English Abstract and Machine Translation.

CN205334222U, English Abstract only.

* cited by examiner

HARDWARE SECURITY FOR AN ELECTRONIC CONTROL UNIT

TECHNICAL FIELD

Embodiments of the present disclosure generally describe hardware based security systems to secure an electronic device, and, more specifically, to a hardware security system for an electronic device, a mobile device or a motor vehicle.

BACKGROUND

Vehicles contain various control modules that include processors that execute instructions to control various aspects of the vehicle, e.g., engine, infotainment, motor, traction battery, body control, brakes, transmission, climate control, etc. Vehicles are increasing connected to communication networks. As a result, there is an increased threat for the download of malicious software instructions into the control modules. As vehicles become more digitally connected to external computing devices, exposure to an attack is increased. Examples of types of attacks may include attacks that infiltrate vehicle electronic and/or software systems, reprogram control modules.

Authentication of a file may be performed to validate a source and/or content of the file prior to execution. Authentication is performed to prevent download and/or execution of a malicious file and/or to prevent malicious and/or unauthorized alteration of a file. Consequences of executing an invalidated file can include unintended vehicle system behavior, decreased life of vehicle components, loss of vehicle anti-theft features, potential tampering with vehicle components, alteration of vehicle files, and/or loss of vehicle features and/or functions. Execution of an invalidated file can also result in a vehicle warranty being voided, the vehicle not operating as expected, or vehicle data being corrupted. Security of software in electronic devices is needed.

The background description provided herein is for the purpose of generally presenting context of the present disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle electronic control unit is described that includes a main processor to perform tasks assigned to the control unit and a security processor to decrypt and encrypt data used by the main processor. A memory is provided to store vehicle data for use by the main processor and processed by the security processor. The security processor includes programmable hardware that is configured to encrypt and to decrypt data from the memory for use by the main processor. The programmable hardware may include field programmable circuitry. A substrate defines a bus to connect the main processor, the memory, and the security processor, while supporting the main processor, the memory, and the security processor. In an example, a communication channel or external data link is available from where data can go in and out of the system, or into and out of the mobile device, e.g., vehicle or mobile electronic device.

In an example, the security processor includes a plurality of IP cores that include reconfigurable circuitry to assign each IP core a task for encryption or decryption.

In an example, at least one of the IP cores includes circuitry configured for decompression data and at least one of the IP cores includes circuitry configured for compression data.

In an example, the IP cores operate as state machines, e.g., finite state machines, that run in parallel with the main processor.

In an example, the security processor is configurable to a new encryption scheme or a new decryption scheme by reconfiguring hardware. The security processor can also be configurable to a new or updated compression/decompression scheme by reconfiguring hardware. The security processor can also be configurable to a new or updated authentication scheme by reconfiguring hardware. The security processor can be reconfigured in part or in whole. The reconfiguration can occur during the run-time of the main processor or the security processor. In an example, the reconfiguration may occur when the main processor is off-line, e.g., not processing or when the vehicle is turned off.

In an example, at least one of the IP cores is configured to produce security counter measures, e.g., against side channel attacks to the vehicle control unit, circuitry, processors and the like. The security counter measures can be executing during run-time of other IP-cores or the main processor.

In an example, the IP core for security counter measures senses current drawn by the main processor and the security processor and consumes current to maintain an essentially constant current on the substrate to reduce sensing operation of the security processor and the main processor.

In an example, the IP core for security counter draws current in a random pattern to mask currents to and from the main processor and the security processor.

In an example, the IP core for security counter outputs random electromagnetic radiation to mask operation of the main processor and the security processor.

In an example, the IP core for security counter outputs acoustic signals or information to mask operation of the main processor and the security processor.

In an example, the main processor is engaged in vehicle to vehicle communication with numerous connections that cause a delay resulting in a connection failure at least one of the connections and at least one of the IP cores is configured to authenticate the vehicle to vehicle communication in parallel to the main processor.

In an example, the main controller receives a command that a cryptographic code is compromised, the main controller enters a secure mode where no critical operations are allowed from received data until a specific secure connection is stablished and the cryptographic code is upgraded in the security circuitry.

In an example, the main controller, after confirmation of successful upgrade of encryption/decryption algorithms by the security processor, sends the same hardware algorithm upgrade to a second electronic control unit in a vehicle so that the hardware encryption-decryption algorithm is also upgraded in the second electronic control unit.

In an example, an electronic control unit, such as an electronic control unit for a vehicle in a non-limiting example, is described to include a memory to store encrypted data and unencrypted data; a main control unit operatively connected to the memory to access unencrypted data; and a hardware encryption-decryption device operatively connected to the memory to access encrypted data for decryption using a hardware algorithm and to access decrypted data for encryption using the hardware algorithm.

In an example, data in the memory is decrypted by the hardware encryption-decryption device using the hardware algorithm and stored in the memory for use by the main control unit. In an example, data in the memory is encrypted by the hardware encryption-decryption device using the hardware algorithm for storage in the memory by the hardware encryption-decryption device. In an example, the main control unit and the hardware encryption-decryption device are separate integrated circuits on a single substrate with a bus connecting the memory with the main control unit and the hardware encryption-decryption device and process data in parallel.

In an example, the hardware encryption/decryption device can receive data coming from an external communication channel connected to the electronic control unit and encrypt/decrypt the data on the fly. The hardware encryption-decryption device stores the processed data in memory or sends the processed data through an external communication channel to an external device.

In an example, the main control unit receives a hardware algorithm update in a compressed, encrypted data file, sends the hardware algorithm update to the memory, and the field programmable device decompresses and decrypts the hardware algorithm update, wherein the hardware encryption-decryption device uses the decrypted hardware update to update the hardware algorithm in the hardware encryption-decryption device while the main control unit processes other software tasks.

In an example, hardware encryption-decryption device includes a field programmable device or programmable logic.

In an example, the hardware encryption-decryption device includes a field programmable gate array.

In an example, the main control unit receives an update for the hardware algorithm in the field programmable gate array.

In an example, the update is a new cryptography algorithm in run-time.

In an example, the hardware encryption-decryption device includes a plurality of IP cores, wherein the update is to erase at least one of the IP cores and install a new hardware algorithm.

In an example, the hardware encryption-decryption device includes a plurality of IP cores, wherein the update is to add a further IP core to the hardware algorithm.

In an example, the hardware encryption-decryption device includes a plurality of IP cores, wherein the update is to change specific processing of an IP core in run-time.

In an example, the hardware encryption-decryption device includes a plurality of IP cores, wherein the update is to remove an IP core from the hardware algorithm.

In an example, the main control unit receives a hardware algorithm update in a compressed, encrypted data file, sends the hardware algorithm update to the memory, and the field programmable gate array decrypts the hardware algorithm update, wherein the main control unit uses the decrypted hardware update to update the hardware algorithm in the hardware encryption-decryption device.

BRIEF DESCRIPTION OF THE DRAWINGS

The embodiments of the present disclosure are pointed out with particularity. However, other features of the various embodiments will become more apparent and will be best understood by referring to the following detailed description in conjunction with the accompanying drawings in which.

DETAILED DESCRIPTION

Figure 1:
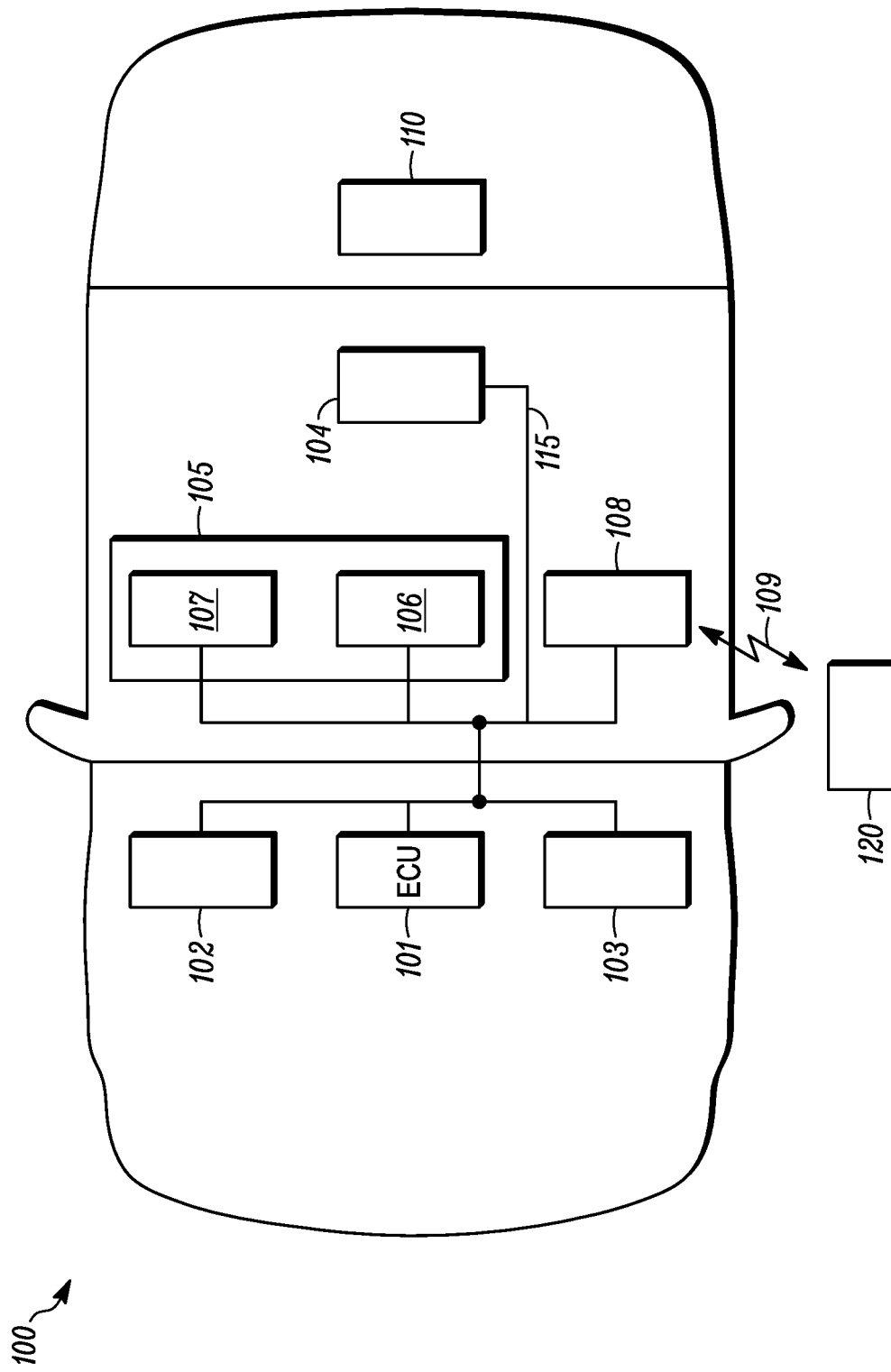
FIG. 1 shows a schematic view of a vehicle according to an example embodiment.

As required, detailed examples of the present invention are disclosed herein; however, it is to be understood that the disclosed examples are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As mobile electronic devices, e.g., vehicles, become more reliant on connectivity, e.g., the cloud computing infrastructures and mobile communication infrastructures, there is an increasing risk of current malicious cyber-attacks on the electronic devices. Vehicles may be in use longer than other electronic devices, such as mobile phone, tablets and the like, and thus may be susceptible to later developed attacks. Vehicles require a stable and sustainable long-term (e.g., ten years or more) cyber security solutions to attempt to secure connected vehicles and automated vehicles. Mobile electronic devices may use the methods and structures described herein to increase the likelihood of securing them against future attacks. In the automotive field, the present description may provide a highly flexible remotely reconfigurable and modular solutions in embedded applications for the automotive field. In an example, many of the vehicles which are being designed today will still be on the road in more than twenty years and at that time it is assumed that quantum computers and highly advanced attack tools may be developed. The implementation of a highly flexible, modular and updateable security solution on programmable logic is one scheme, e.g., using system on chip ("SOC") devices which combine ARM core processors, core processors or the like, heterogeneous hardware resources integrated in a single integrated circuit package (e.g., a FPGA) and a memory, all compacted in a single chip.

As a brief overview, the present disclosure can deliver an automotive-oriented solution for security, privacy and authentication through a system architecture composed of cryptographic IP engines based on reconfigurable hardware technology and deployed through a hardware/software codesign scheme. The present description delivers an E-safety vehicle intrusion protected applications (EVITA) full security level embedded solution or other secured vehicle to machine communications intended for V2X and high-end/compute-intensive electronic control units (ECUs), which can include emerging computational and communication units that vehicle manufacturers are starting to request. The present system can provide additional security for vehicle communications. As described herein, a system-on-chip (SOC) can integrate and secure the data authentication, data digital signature, as well as the encryption and decryption of data and instructions in a vehicle or other mobile devices. The SOC platform can include a plurality of processing cores, programmable logic and internal memory for security keys and data storage. The SOC can include network protection (ETHERNET/CAN firewall) and firmware over the air capability. Additionally, the usage of IP cores allows the offloading from the processors running software to dedicated IP cores to execute encryption and decryption, as well as data compression and decompression. The IP cores can also preform data authentication and signature tasks. In an example, the critical and time-consuming parts of the encryption and decryption algorithms are stored and performed directly in hardware in the IP cores. In an example, the critical and time-consuming parts of the compression algorithm(s) and decompression algorithm(s) are performed directly in hardware in the IP cores. In an example, the critical and time-consuming parts of the data authentication and signature algorithm(s) are performed directly in hardware in the IP cores.

FIG. 1 depicts a vehicle 100 that includes various control modules (sometimes referred to as electronic control units, or "ECU") that control operation of various systems in the vehicle. The control modules include hardware, e.g., circuitry, that execute instructions to perform various tasks in the vehicle and memory to store instructions, received data and processed data. The vehicle 100 may include an automobile, a hybrid automobile, an electric automobile, pickup trucks, trucks, motorcycles, and the like. An electronic control unit (ECU) 101 may control a series of actuators on an internal combustion engine or electric motors to control engine performance or motor performance. The ECU 101 may receive data values from a multitude of sensors within the vehicle, process the data using rules and instructions, e.g., using lookup tables, and adjusting the engine actuators according to the rules and instructions. An electric power unit 102 may assist the ECU 101 by controlling the flow of electrical energy in the vehicle, e.g., to and from a traction battery 110, in the case of a vehicle using electrical energy for motive power. A powertrain control unit 103, in concert with the ECU 101, may control operation of the transmission. Other modules may be provided that control various operations of the vehicle, e.g., a brake control unit. An electronic control unit (ECU) 104 is provided that may include a vehicle identifier identifying the vehicle and providing vehicle security for its communications within the vehicle and communications to devices and systems outside the vehicle 100. The ECU 104 may be a hardware device dedicated to control the vehicle architecture and performance. In some cases, the ECU 104 may be called a Body Domain Controller and may include a gateway dedicated to handling vehicle internal, e.g., telematics, and external communications or processing. The ECU 104 may further include sensors or other vehicle modules.

Some vehicle control modules are within the cabin of the vehicle and may include a head unit 105, which may include an infotainment unit 105 and a communication unit 108. The infotainment unit may provide various human to machine interface to persons with in the vehicle and may include a circuitry and displays including an audio unit 106 and a data processing unit 107. A communication unit 108 may be connected to vehicle control units and provide a communication channel 109, e.g., wireless channel, to a vehicle service server 120 or other systems remote from the vehicle 100, e.g., a mesh network, vehicle to vehicle communication, cellular communication, and the like. In an example, the communication channel may include a hardwired connection, e.g., an electro-mechanical interface, e.g., universal serial bus, on-board diagnostics port.

A bus 115 can provide communication channels within the vehicle between the various modules. The bus 115 can include a controller area network (CAN), Local Interconnect Network (LIN), Avionics Full-Duplex Switched Ethernet (ARNIC) and the like.

Figure 2:
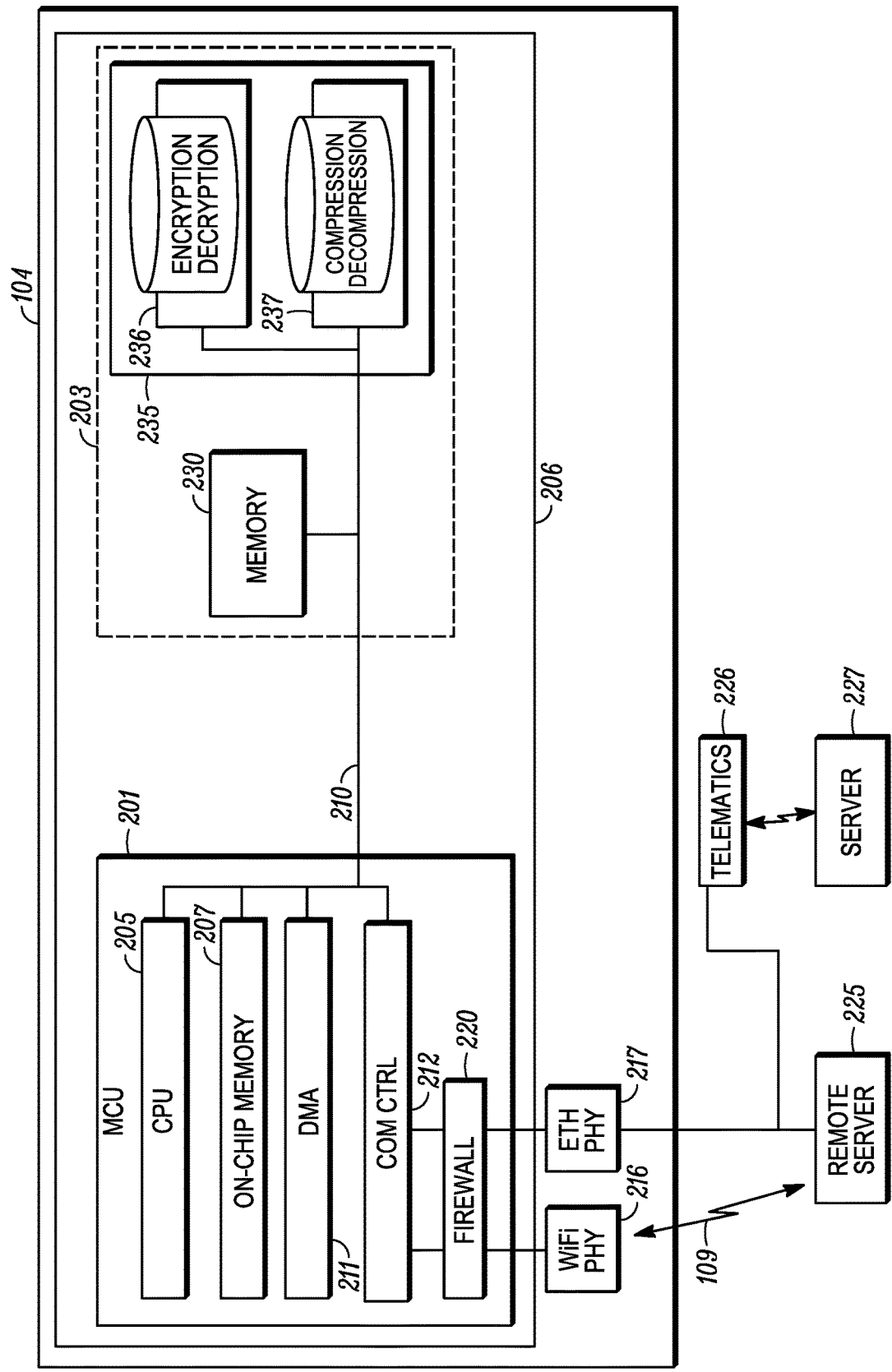
FIG. 2 shows a view of an electronic control unit according to an example embodiment.

FIG. 2 shows a schematic view part of the electronic control unit (ECU) 104 with a main controller 201 and a security circuitry 203. Other electronic stages or circuitry, to fulfill other vehicle functions related to the ECU (e.g., electrical load driver) are not shown, but understood by persons of skill. In an example, both the main controller 201 and the security circuitry 203 are integrated in a single piece of silicon, e.g., on substrate 206. The main controller 201 includes a processor 205 that can load instructions from a memory to execute various tasks for the vehicle. A memory 207 may store instructions and/or data related to the vehicle. The memory 207 may store data from various sources. A bus 210 electrically connects the processor 205 and memory 207. A direct memory access controller 211 is connected to the bus 210 to drive access from a communication controller 212 and from other circuitry outside the main controller 201. The communication controller 212 controls the communication to devices and systems outside the ECU 104 via at least one of a Wi-Fi physical layer 216 and an Ethernet layer 217 through a firewall 220, which may be positioned between the Wi-Fi physical layer 216 and the Ethernet layer 217 and communication controller 212. The firewall 220 may be integrated on the substrate 206. In an example embodiment, the firewall may be circuitry outside the substrate 206. The physical layers 216, 217 may be outside the substrate 206. The firewall 220, in the vehicle, may operate as a communication security system that monitors and controls incoming and outgoing electronic communications into and out of the vehicle based on set security rules. The firewall 220 includes circuitry to establish a barrier between a trusted, secure internal network, e.g., the modules 101-105, 108 and another outside network, e.g., the Internet, connected thereto, which is not a secure or trusted communication source. The remote server 225 may be at a vehicle repair facility, another mobile device, another vehicle or at a manufacturer's computer system. The path 109 may define a V2X communication path. The remote server 225 may provide instruction updates to the vehicle, e.g., software updates. The instruction updates may be encrypted and compressed at the remote server 225 and received at the security circuitry 203 for decryption before use by the controller 201 or loaded into other vehicle control units.

A telematics circuitry 226 may be connected to the firewall 220 to provide communication to and from the vehicle, the communications can be encrypted and compressed. The telematics circuitry 226 can send, receive and store information via telecommunication devices in conjunction with effecting control on the vehicle or the mobile device containing the telematics circuitry. The telematics circuitry 226 provides integrated use of telecommunications and informatics for application in vehicles and with control of vehicles on the move, and can include global satellite positioning systems, e.g., for use with automotive navigation systems.

The security circuitry 203 includes a memory 230 that can receive downloaded files, e.g., instructions from the server 225, directly from the direct memory access controller 211. The memory 230 can also be accessed directly by the processor 205. Encryption and decryption circuitry and compression and decompression circuitry 235 is in communication with the memory 230. The circuitry 235 is hardware, for example, field programmable device, FPGA and the like; the hardware of circuitry 235 includes encryption and decryption circuitry 236 and compression and decompression circuitry 237. The encryption and decryption circuitry 236 can read encrypted files from the memory 230 or the bus 210 and decrypt the file using the hardware. The encryption and decryption circuitry 236 can read decrypted files from the memory 230 or the bus 210 and encrypt the file using the hardware. The compression and decompression circuitry 237 can read decompressed files from the memory 230 or the bus 210 and compress the file using the hardware of the compression and decompression circuitry 237. The compression and decompression circuitry 237 can read compressed files from the memory 230 or the bus 210 and decompress the file using the hardware of the compression and decompression circuitry 237. The circuitry 235 can store the decrypted/encrypted files back into the memory. The circuitry 235 can be an application specific integrated circuit (ASIC), which is static hardware and is not reconfigurable, one-time programmable integrated circuit, which can be programmed once and thereafter is static, a flash-based integrated circuit, which is erasable and programmable, and a RAM-based circuit, which is reconfigurable, even on the fly while processing. The circuitry 235 represents hardware to process files and, in some cases, includes FPGA structures. The use of reprogrammable hardware in circuitry 235 allows upgrading the decryption and encryption processing steps and the compression and decompression steps in the encryption/decryption circuitry 236 and the compression/decompression circuitry 237. Thus, if either the decryption or encryption in encryption/decryption circuitry 236 and the encryption circuitry 237 is broken by hackers or others, the decryption or encryption can be updated to new and unbroken processing steps. The circuitry 235 can adapt to a high level of performance able to withstand the V2X application demands, e.g., the high number of signature verifications per second requirements. In an example, adapting to different performance requirements can be accomplished by reconfiguring the circuitry 236 to perform additional tasks or different tasks. The circuitry 236 can provide hardware countermeasures against side channel attacks, i.e., within circuitry (e.g., IP cores) to increase the level of protection of the present system. Side channel attacks may include power consumption, EMC, sound, time analysis, etc. to determine the encryption and decryption in the circuitry 236.

The circuitry 236 can implement various forms of modern signal processing, e.g., cryptography, such as AES128, AES256, SHA-2, SHA256, SHA512, TRNG/PRNG (random number generation), as well as Post-Quantum Cryptography (e.g., McEliece, NTRU and the like), i.e., new cryptography that will come after the emergence of quantum processors in the coming years, which may be able to break some of the crypto algorithms in use today, if needed. The circuitry 235 can include data authentication functions, e.g., HASH (data authentication), token checks, signature authentication or the like. The circuitry 235 may further include logic instructions for implement hardware countermeasures, e.g., specific logic responsible for obscuration of the electrical current consumption, acoustics, the electromagnetic emissions and/or the time in the execution of instructions by the circuitry 235.

In an example embodiment, the ECU 104 is fully integrated into a single piece of silicon, e.g., a system-on-chip, with the controller 201 and the decryption and encryption circuitry 235 being separate processing cores that are electrically connected via the bus 210. The memory 230 can also be integrated on the same silicon as the controller 201 and the decryption and encryption circuitry 235. In an example, the memory is not on the same piece of silicon and the decryption and encryption circuitry 235 can decrypt data from the memory 230 and encrypt data being sent to the memory 230.

The memory 230 may be integrated onto the single substrate with the main controller 201 and the security circuitry 203. The memory 230 may be shared by the main controller 201 and the security circuitry 203. In an example embodiment, the memory 230 may be a single memory that is space partitioned for different data states, e.g., encrypted and decrypted data. In an example embodiment, the memory can be partitioned into two partitions, one for encrypted data for use by the security circuitry 203 and a second partition with the decrypted data that can be used by both the security circuitry 203 and the main controller 201. In an example embodiment, there can be further partitions in the memory based on the compressed data and decompressed data, in addition to the encrypted status of the data.

The main controller 201 controls communication of the substrate and to the security circuitry 203. The security circuity 203 does not communicate directly to devices off the substrate.

In the vehicle there may be other electrical units apart from ECU 104 that need to work with encrypted data. These other units would also have same processing structure of ECU 104, e.g., with a main processor 201 and security circuitry 203. Then, whenever a hardware encryption algorithm is required or received, the ECU 104 would then upgrade the internal algorithm and after satisfactory completion of the process, would send the required information to the other units so that these initiate the same upgrade.

During vehicle life, it may happen that the cryptographic algorithms used by the electronic control unit 104 may become broken. This results in a possible threat of data hacking in the next incoming messages. The vehicle may receive an alarm or warning message, which is sent to all the vehicles having said compromised cryptographic algorithm. The main controller 201, after receiving said message would make the vehicle system enter a degraded or secure mode to prevent said possible hacking message to damage the vehicle. This mode would prevent, for example, that any function upgrade is done, in software or in hardware, either to ECU 104 or to any other ECU in the car, from any further incoming information. This mode may be removed at a service center or through a non-compromised over-the-air ("OTA") update. A service center may use an OBD connection or secure wireless connection to the vehicle.

Additionally, main controller 201 may have algorithms (either in software or in hardware IP of 205) to detect abnormal operation due to an ongoing hacking process and to initiate a response to an attack detected by the countermeasures or to enter in said degraded or secure mode, that could include a warning message to the user requiring car servicing. In an example, the attack detection algorithms may be running constantly in either the main controller or in the reconfigurable areas of the security circuitry.

Figure 3:
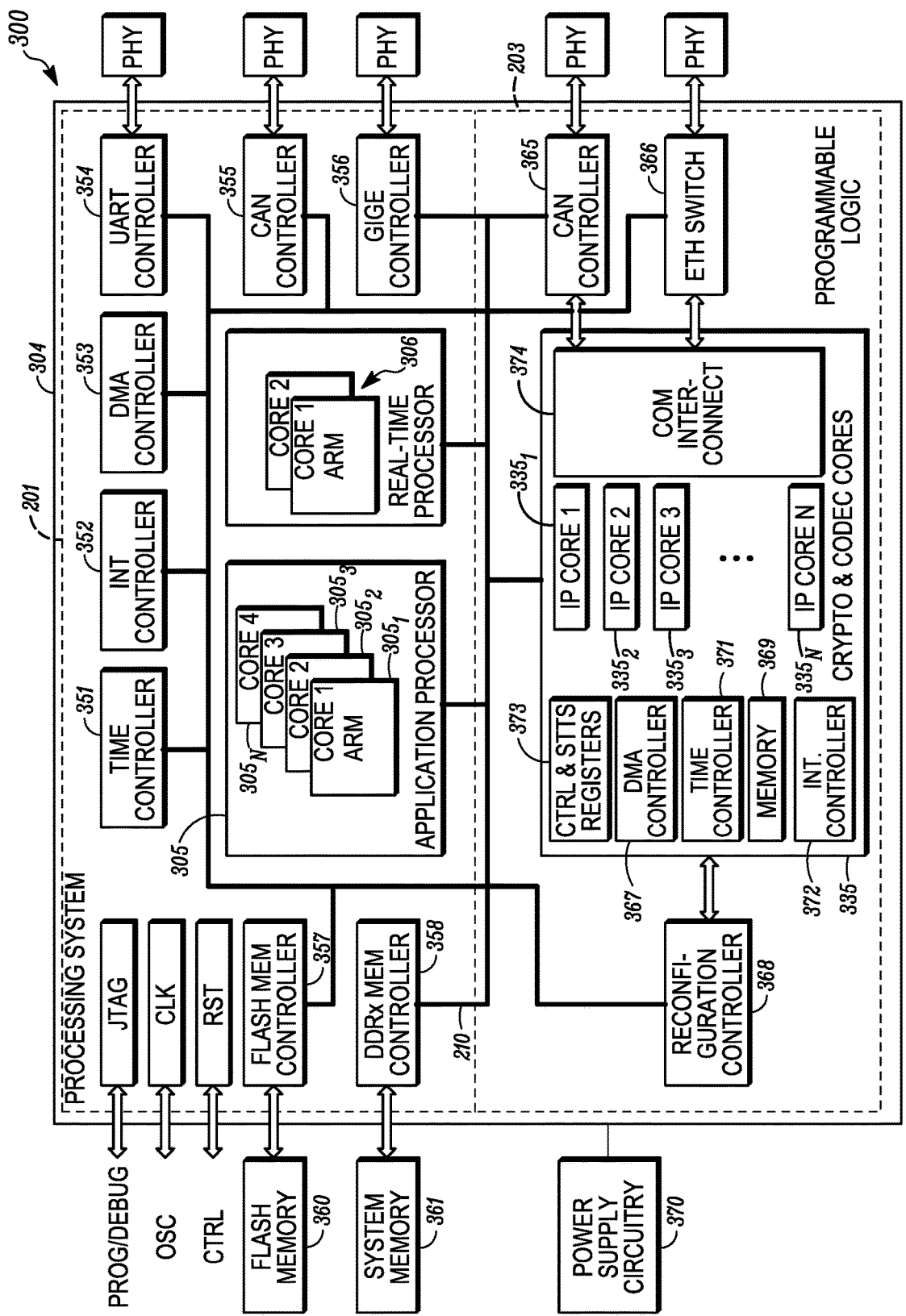
FIG. 3 shows a view of an electronic control unit according to an example embodiment.

FIG. 3 shows a processing system 300, which can be part of ECU 104 in some example embodiments. The processing system 300 include a main controller 201 and a security circuitry 203 supported on a single substrate. The processing system 300 may include a processor 305 for processing required algorithms assigned to the system 300, which can be part of the main controller 201. The processing system 300 may include a dedicated IP-core processor 335 for handling the encryption and decryption of instructions and/or data. The processor 335 can be part of the security circuitry 203. The processing system 300 may further handle communication through Ethernet, CAN or any other bus, or any other specific functionality required in the processor 305, e.g., compression, decompression, sensor data processing, or the like. Other IP cores may perform other functions in the processor 305. The processor 305 may include multiple computing cores $305_1$, $305_2$, ... $305_N$, for running applications and a plurality of real-time processing cores 306. The IP-core processor 335 also includes a plurality of processing cores $335_1$, $335_2$, $335_3$, ... $335_N$, which can include FPGA processors. Each of the processors 305 (i.e., $335_1$, $335_2$, $335_3$, ... $335_N$) and 306 can take advantage of parallel processing using multiple cores for their respective tasks. The tasks can include encryption, decryption, compression, decompression and authentication. The bus 210 is provided to provide communication between the devices. The bus 210, IP-core processor 335 and processor 305 may be formed on a unitary, single silicon substrate. A time controller 351 is connected to the bus 210 and will provide a time signal to the devices connected to the bus. An interrupt controller 352 is connected to the bus 210 and may combine several sources of interrupt onto one or more lines connected to a processor 305 or 335, while allowing priority levels to be assigned to its interrupt outputs.

Communication devices can control communication within the substrate and to devices outside the substrate. A direct memory access controller 353 is connected to the bus 210 and provides direct memory access to allow certain hardware subsystems to access main system memory (RAM) or nonvolatile memory independent of the processor 305. A universal asynchronous receiver/transmitter 354 is connected to the bus 210 and can provide asynchronous serial communication in which the data format and transmission speeds are configurable. The universal asynchronous receiver/transmitter 354 interfaces with a physical layer to communicate to other electronic devices such as electronic circuit, load drivers, I/O multiplexers, and the like, which can be in the same ECU, in electronics or in the vehicle. A CAN controller 355 is connected to the bus 210 and provides communication to the CAN bus in the vehicle. A Gigabit Ethernet controller 356 is connected to the bus 210 and provides communication with other devices over an Ethernet connection.

A non-volatile (e.g., flash) memory controller 357 is connected to the bus 210 and provides communication with a non-volatile (e.g., flash) memory 360. A random access memory controller 358 is connected to the bus 210 and provides communication with the memory system 361, which can include a DDR SDRAM memory. The memories 360, 361 can store encrypted files and/or compressed files for decryption and decompression use, or the like, by the IP cores 335. The decrypted and decompressed files can be stored in the memories 360, 361 for use by the application processor 305 and/or real-time processor 306 and security processors 335 in the vehicle.

The processor 335 operably connects to or interconnects to a CAN controller 365 that is connected to the bus 210, a physical layer and the IP core processor 335. An Ethernet switch 366 is connected to the bus 210, a physical layer and the IP core processor 335. A hardware reconfiguration controller 368 is connected to the bus 210 and the IP core processor 335. The reconfiguration controller 368 can be used to reprogram the cores of the IP core processor 335 or individual cores thereof.

The security processor 335 can be composed of a time controller 371, interrupt controller 372, a DMA controller 367, control & status registers 373, memory 369 and communication interconnections 374 being all connected to the system bus 210. Memory 369 may be defined and used locally in 335 for execution of the algorithms in the IP-cores and also store cryptographic keys. The memory 369 may be addressed with a configurable bus with the security processor 335 to allow for variable width words communicating between the memory 369 and the processing cores 335.

A power circuit 370 is provided to supply electrical power, e.g., on a power rail in the substrate, to the processors 305, 335 and the controllers, memory and other electrical devices. Other electronic stages, to provide further functionality in the ECU 104 to fulfill other vehicle needs, may be used and connected to the circuitry described herein.

The processors 235 and 335 provide a flexible and customizable structure, which can be configurable based on a manufacturer request (e.g., a car configuration request) using any of AES, ECC, Hash Whirlpool, SHA, Wireless Access in Vehicular Environments, and the like. The processors 235, 335 can be initially loaded with encryption and decryption algorithms in the hardware. The processors 235, 335 can be an adaptive platform to provide auto-negotiation of security features (data encryption, user authentication). The processors 235, 335 are each capable of dynamically selecting, in real-time, the configuration of IP processing cores to be used at each session/request in which different set(s) of cryptographic primitives/algorithms are available, both on-demand or even as response to specific events in the vehicle. In an example, all of the devices in the processors, 235, 335 or the circuitry 203 can be reconfigurable, in hardware using programmable logic, to different task functions or to different communication channel widths.

The processors 235 and 335 can be upgraded or changed via the external communications via authenticated communications through the current decryption in the processors and authentication tests in the vehicle. This communication is controlled by the main processor 201. The processors 235 and 335 can be scaled, even in real-time, while some processes are being performed. The processors 235, 335 can instantiate in hardware additional IP cores on demand to run in parallel, in a live mode, e.g., suddenly in a vehicle to vehicle (V2V) communication in traffic jam scenario. When a vehicle is in a situation where the number of vehicles in communication, e.g., in a mesh network or on a busy road, V2V true identification needs may increase. The present system 300 can handle the high number of vehicles wanting to interact with the present vehicle and at that moment (run-time) the system may increase the number of IP-cores $335_1$, $335_2$, $335_3$, ... $335_N$ dedicated to the V2V function to increase the processing capability. The cores $335_1$, $335_2$, $335_3$, ... $335_N$ can have their hardware changed to perform different tasks when the task to which they are currently dedicated is not needed. The IP-cores $335_1$, $335_2$, $335_3$, ... $335_N$ can be removed (or decreased in number) from hardware once the external working conditions, environmental working conditions or workload peak ends and they are not needed. The IP-cores can be reconfigured, e.g., at the direction of the reconfiguration controller 368, while other IP-cores are operating on other tasks. Thus, the reconfiguration can occur during run-time, on-the-fly.

The IP-cores 335 can be configured to execute similar or different tasks. Multiple IP-cores 335 may be dedicated to decryption of encrypted data to satisfy the requests from the main controller 201. At least one IP-core can be configured to decompress data according to a first codec. At least one IP-core can be configured to decompress data according to a second codec. At least one IP-core can be configured to authenticate communications from off the substrate. These IP-cores can run their respective tasks in parallel with each other as their hardware is configured to execute the respective tasks or parts of tasks.

The processors 235 and 335 operate as a hardware encryption-decryption device, which is more efficient than software algorithms loaded to a processor or the hardware encryption-decryption device that at times takes advantage of some processor peripherals (HSM) already integrated in the chip of a microcontroller. In current encryption algorithms there is a significant quantity of data for encryption-decryption, then the encryption/decryption operations become too demanding of a task for a conventional processor to perform in real-time while continuing to perform its usual tasks for the vehicle. The present disclosure uses parallel hardware processing of encryption-decryption tasks and the usual processing tasks in the different processors 205, 305 and the encryption/decryption dedicated processor 235, 335. This provides a reduction of processing needs for the main processor 205, 305, and makes it faster for the usual tasks it performs. The use of the multiple cores and the parallel processors the encryption and decryption processing capabilities are to change based on demand or to adapt to the state-of-the-art. For example, if AES256 encryption is used for cars on sale today, this may be changed to post-quantum encryption algorithms if AES256 encryption becomes vulnerable. On the other hand, in a given situation, like in a traffic jam, V2V true identification needs may increase, to handle the high number of vehicles wanting to interact and at that moment (run-time) the system may increase the number of IP-cores dedicated to said function to increase said processing capability. In an example, IP-cores performing other functionality not needed at that time, may be changed to performing the encryption/decryption tasks needed for V2V true identification.

The processors 235, 335 can also include the compressing-decompressing functionality to ensure that data is completely available and timely to main processors 205, 305 in real time with the compressing-decompressing function being transparent to the main processors 205, 305, in the same sense as the encryption-decryption functions. The cores $335_1$, $335_2$, $335_3$, . . . $335_N$, can be individually adapted, by reprogramming, to perform compression/decompression tasks in addition to or in place of decryption/encryption, e.g., when the vehicle receives or sends large data files. This flexible approach to use of the cores $335_1$, $335_2$, $335_3$, . . . $335_N$, allows the processor 335 to adapt to the state-of-the-art and the current processing needs of the vehicle. In an example, if a processor 335 is operating with 128-byte cryptography, e.g., AES128, then the present system 300 can reprogram additional cores to adopt 256-byte cryptography, e.g., AES256. The present system can also reprogram its hardware in the cores $335_1$, $335_2$, $335_3$, . . . $335_N$ from 128-byte or 256-byte cryptography to a post quantum cryptography, e.g., via downloading an encrypted, compressed file from internal memory or a remote server.

Various methods exist for vehicles to communicate with entities external to the vehicle. In many examples, vehicles may make connections to remote servers using embedded cellular modem devices. In other example, vehicles may utilize vehicle-to-vehicle connectivity to send messages directly between vehicles, to infrastructure controllers or sensors, intra-vehicle communications, or vehicle-to-residence connectivity such as automatic garage openers, user sensible data, or personal data, associated with the vehicle. For vehicles to make connections to entities external to the vehicle, the vehicle may be required to maintain connection information regarding how to connect to the external entity.

The present system 200, 300 can provide data rates at least to V2X standards. On-the-fly data encryption and compression are performed by the processors 235, 335 and provided to the main processors for use in its tasks. The processors 235, 335 can also decompress files for use by the main processor.

The processing systems 104 and 300 can include the main controller 201 and the security circuitry 203 on a single integrated circuit substrate with all communication of unencrypted data and instructions being within the integrated circuit and not over the air or along external wires. In some examples, the memory may also be integrated on the integrated circuit substrate such that encrypted and unencrypted data and instructions are within the integrated circuit and not over the air or along external wires. Additionally, the processing systems are not separate integrated circuits mounted to a circuit board that communicate over traces on the board, which are accessible to read the signals on the traces between devices, e.g., processors and memory. Transmission of decrypted data over the air or along external wires can be monitored and detected unlike the internal bus or transmission lines in the substrate.

The encryption/decryption processor 235, 335 can include a plurality of cores to provide redundant operations and structures. The encryption/decryption processor 235, 335 provide built-in hardware countermeasures against physical attacks, side-channel attacks, e.g., timing analysis, power analysis, electromagnetic analysis and the like, and reducing the likelihood of success of glitching attacks. The integration of the main processors 205, 305 on the same chip (system-on-a-ship) with the memory and the encryption/decryption processor 235, 335 creates a trust zone for secure computing.

Figure 4:
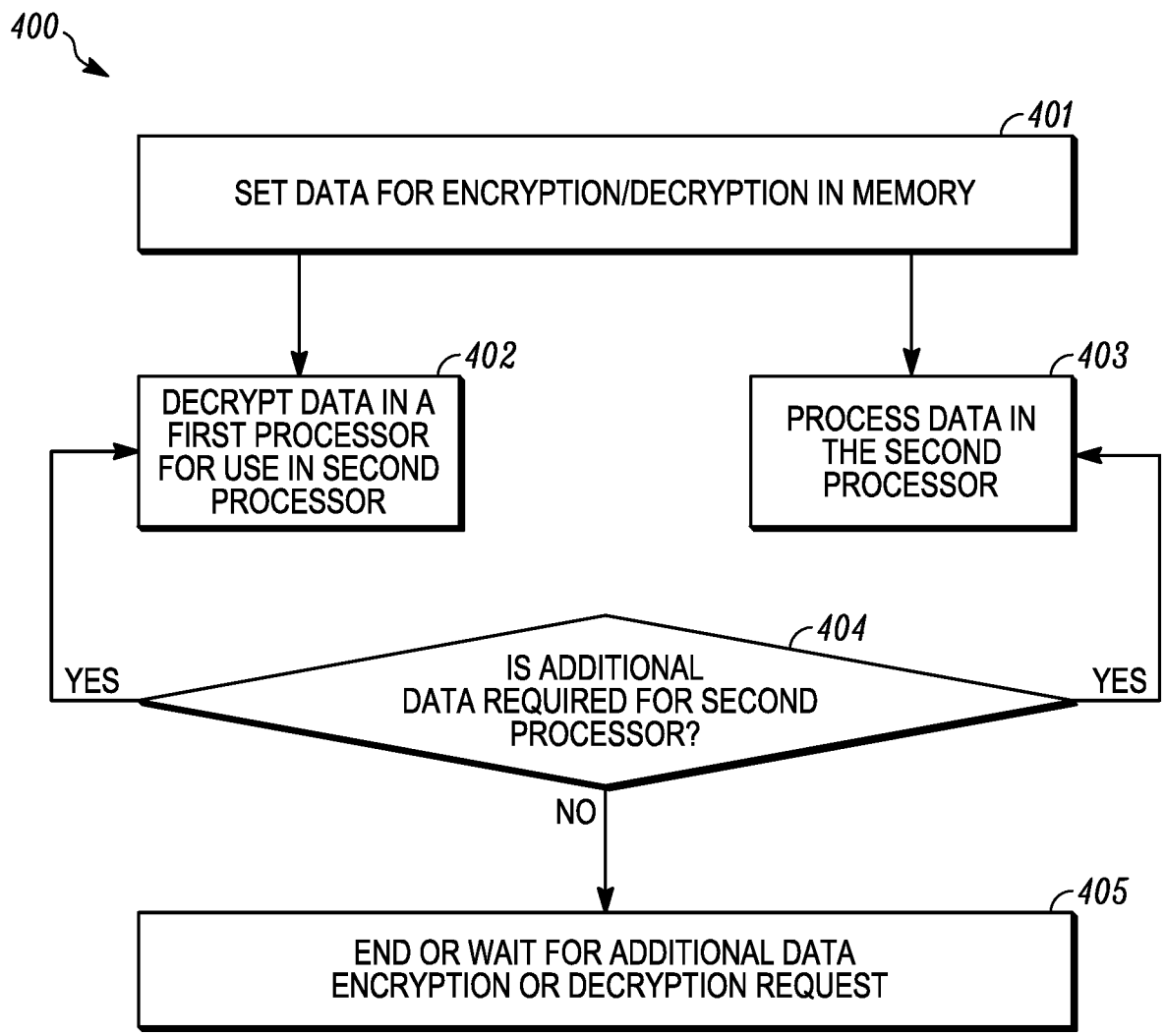
FIG. 4 shows a processing method according to an example embodiment.

FIG. 4 shows a method 400 for providing secure processing in a vehicle. At 401, the hardware configuration for encryption and decryption is fixed in a memory for processing in the first processor core, to decrypt (and decompress, if needed) to allow the data to be used in the main processor, e.g., processor 205 or processor 305. The first processor thus provides hardware security by implementing encryption and decryption instructions in hardware and not loaded software in a general purpose computer processor. At 402, data is decrypted using the first processor core for use in the second processor core. In parallel with the step 402, step 403 can be performed. At 403, software instructions are executed in the second processor to interpret information (e.g., data from the decrypted file stored in memory) and provide outputs. The second processor, e.g., the main processor 201, can operate on data that is not required to be decrypted at that point in time. Thus, there can be parallel processing. The second processor does not perform decryption or encryption; these processes can be done by the first processor. At 404, if additional data is required, then the process returns to both steps 402 and 403. At 405, the method 400 can end or wait for additional data encryption or decryption request.

The present systems may be used to provide secure processing in a vehicle. In an example, data is received at the vehicle or produced in the vehicle, e.g., either sensed by sensors or determined from processing by processors. The data can be encrypted and compressed for security and efficiency, respectively. The encrypted data is stored in memory, which can be a single silicon substrate with the processors. The encrypted data is accessed by the decryption and decompression processor, e.g., encryption/decryption processor 235, 335. This access can occur when the main processor requests the data. The data reception ends. The decryption and decompression of the requested data is performed. The decrypted data can be stored in memory or otherwise provided to the main processor. The main processor may perform other tasks while the encrypted data is being decrypted by the decryption processor, e.g., circuitry or IP cores. In an example, the data reception, the data compression/decompression, the data encryption/decryption and the transmission of the data can occur in in a pipeline order in hardware through successive IP cores.

The present systems may be used to provide secure processing in a vehicle. In an example, data is identified in the vehicle, e.g., by the main processor, to be sent from the vehicle or sent from the secured, trusts zone of the single substrate. The data is accessed by the encryption processor to encrypt the data, and if needed, compress the data. The data is sent from the vehicle in its encrypted, and if needed compressed, form, e.g., at direction of the main processor.

The present systems may be used to provide secure processing in a vehicle. In an example, an indication that data is being received at the vehicle or in the single substrate for storage in memory. The indication can be a request from the main processor or an indication from a remote server to the vehicle. In the case of a request from the main processor, it sends a command request. The data reception command is stored and launches the decryption and, if needed, decompression, of the data at the decryption processor. The decryption processor decrypts the data and sends the data either back to memory or to a buffer for the main processor. While, the decryption is occurring at the decryption processor, the main processor processes other tasks assigned to the main processor, but not processing the intensive decryption required on the data. After the other tasks are completed, the main processor returns to the decrypted data to read and process the decrypted data.

The present systems may be used to provide secure processing in a vehicle. In an example, data is identified to be sent to memory or off the substrate. This identification can be done by the main processor. The encryption processor receives the command and the data and encrypts the data and, if needed, compresses the data. The command for delivery of data is stored in a memory controller, which waits until the encryption processor delivers the encrypted data. Thereafter, the data can be sent, e.g., off the vehicle or off the single silicon substrate that supports the main processor, the encryption processor, memory controller and bus between these devices.

Figure 5:
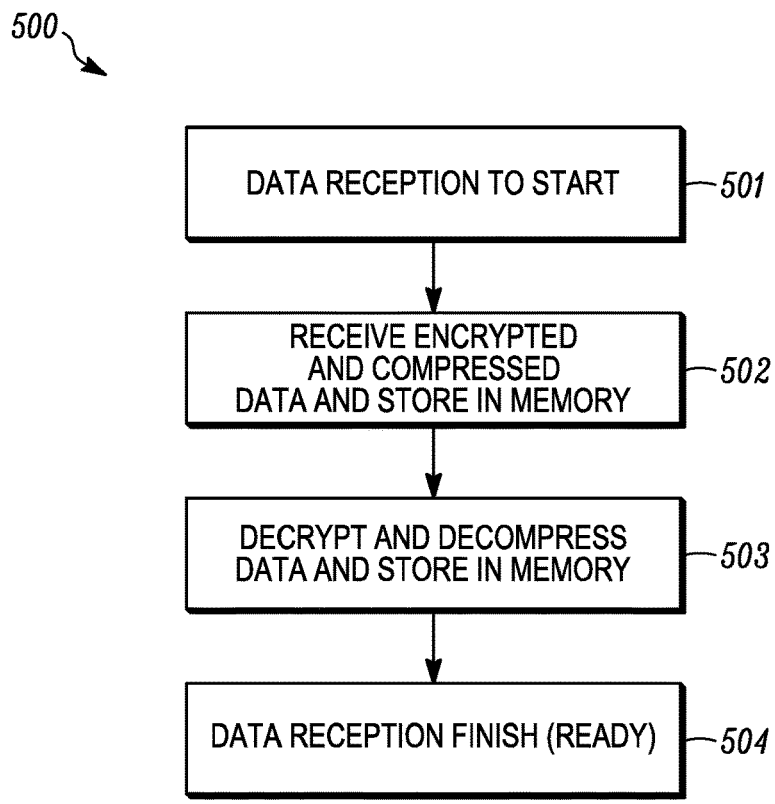
FIG. 5 shows a processing method according to an example embodiment.

FIG. 5 shows a method 500 for providing secure processing in a vehicle. At 501, data is received at the vehicle. The data can be encrypted and compressed for security and efficiency, respectively. At 502, the data is stored in memory, which can be a single silicon substrate with the processors. At 503, the data is accessed by the decryption and decompression processor. This access can occur when the main processor requests the data. At 504, the data reception is ended and the step 503 can complete the decryption and decompression. In an example, embodiment, the steps 502, 503 and 504 can occurring in a pipeline processing parts of the data file (e.g., blocks) while other parts are being processed in the prior steps. Actions 502 and 503 can be performed sequentially or in parallel, i.e., at the same time and in pipeline.

Figure 6:
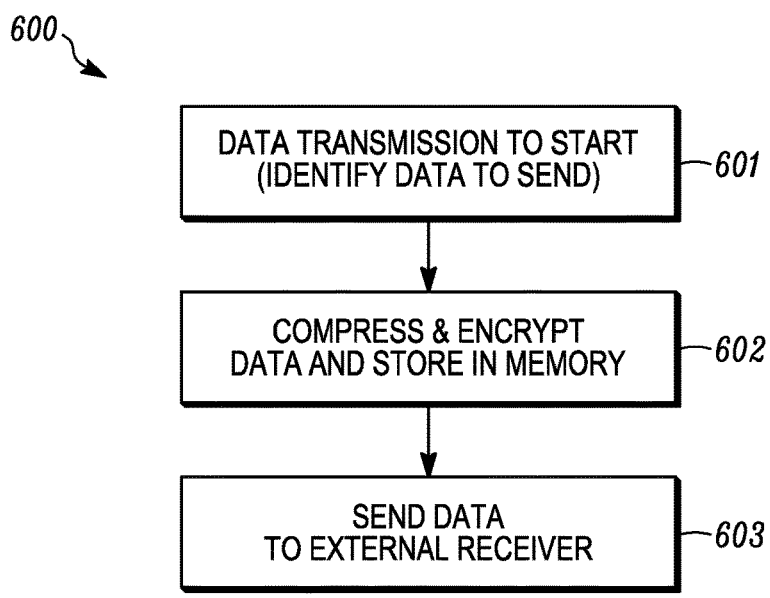
FIG. 6 shows a processing method according to an example embodiment.

FIG. 6 shows a method 600 for providing secure processing in a vehicle. At 601, data is identified in the vehicle, e.g., by the main processor, to be sent from the vehicle or sent from the secured, trusts zone of the single substrate. At 602, the data is accessed by the encryption processor to encrypt the data, and if needed, compress the data. At 603, the data is sent from the vehicle in its encrypted, and if needed compressed, form.

Figure 7:
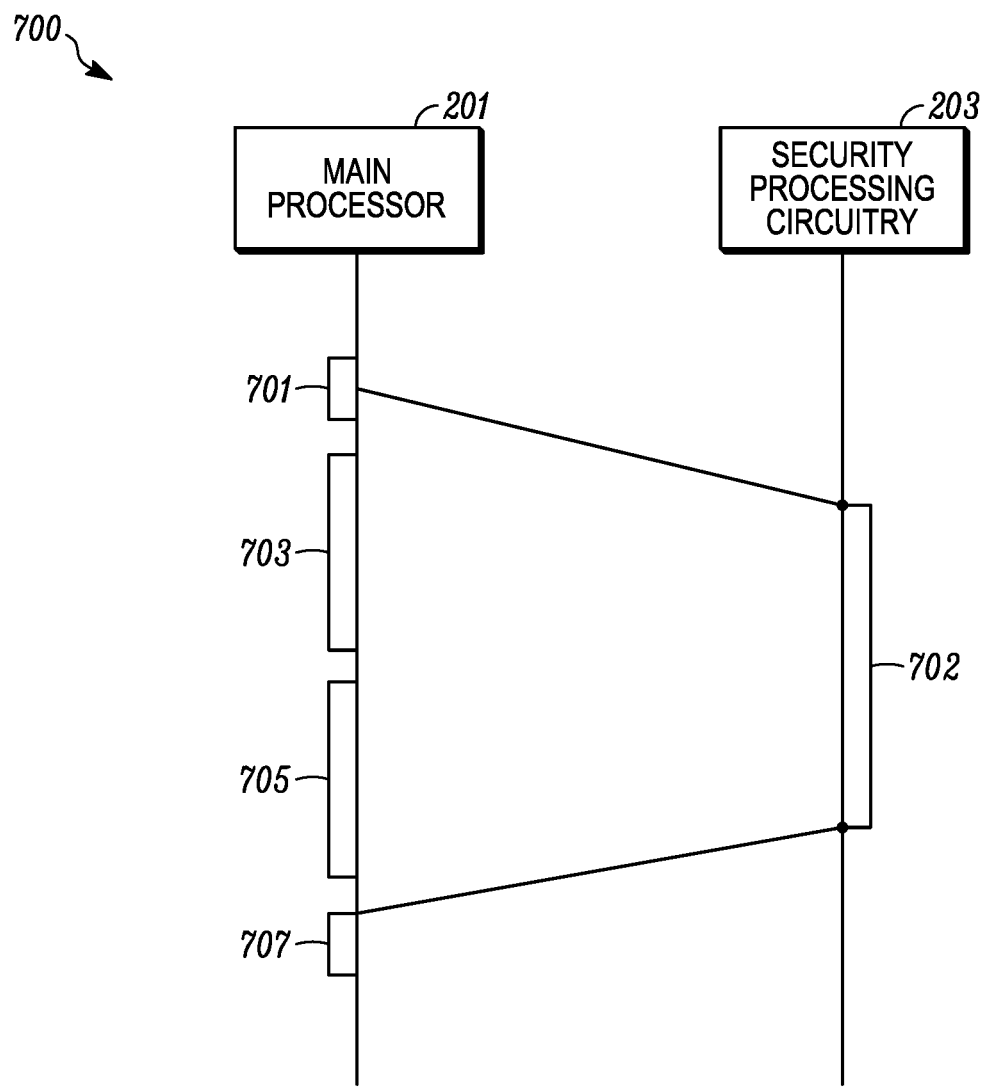
FIG. 7 shows a processing method according to an example embodiment.

FIG. 7 shows a processing method 700 according to an example embodiment. The processing method 700 shows an example timing diagram with the timing for the main processor 201 on the left time line and the timing for the security circuitry 203 on the right side. The timing runs from top to bottom. At 701, the main processor 201 issues a data request command. The data request command is received at the security circuitry 203. The data request command may remain in the same substrate as the main processor 201 and the security circuitry 203. At 702, the security circuitry 203 decrypts the data. While the security circuitry 203 is decrypting the requested data, the main processor 201 executes a first task at 703. The first task may not require the encrypted, requested data. At 705, the main processor 201 may execute a second task 705 while the security circuitry 203 is decrypting the requested data. When the security circuitry 203 completes the decryption of the requested data, it sends a data available signal to the main processor 201. The main processor 201 may thereafter execute a processing task using the decrypted data at 707.

Figure 8:
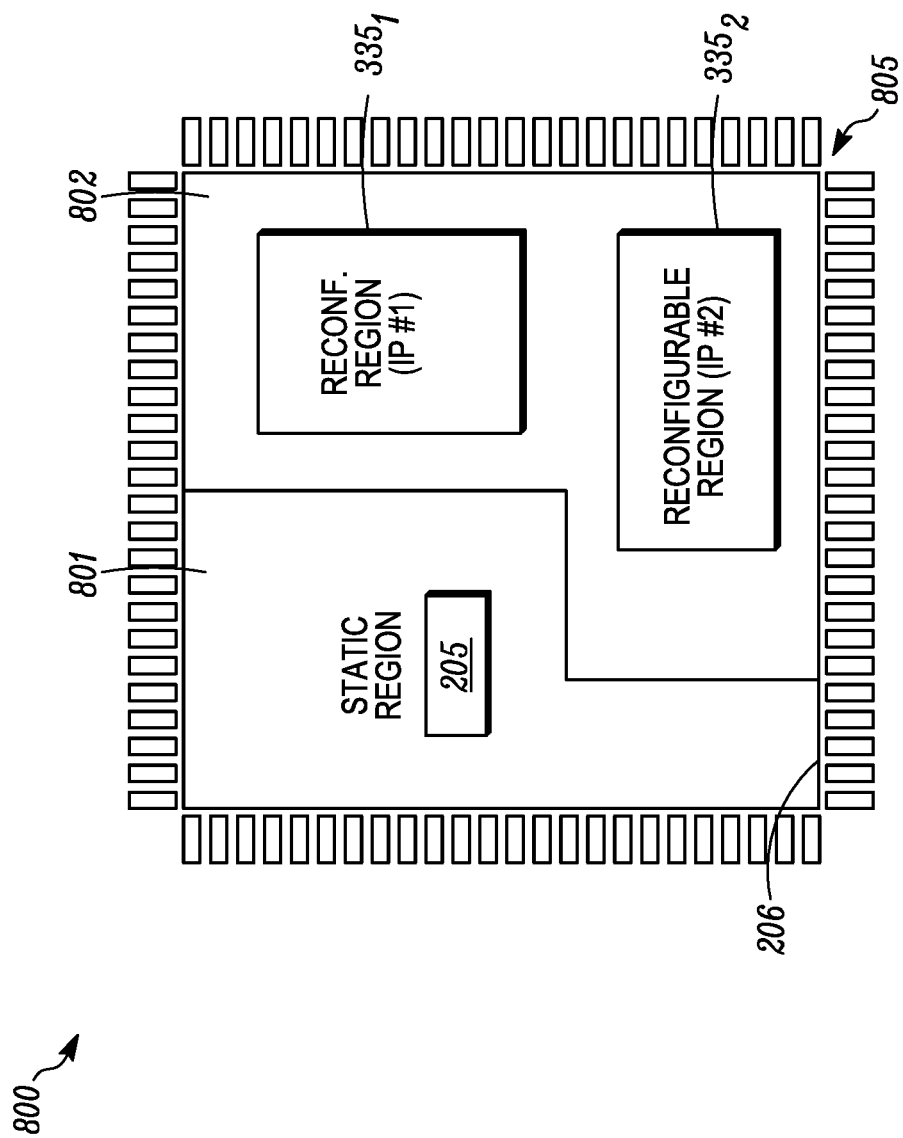
FIG. 8 shows a schematic view of a control unit according to an example embodiment.

FIG. 8 shows a schematic view of a packaged integrated circuit 800 that includes a static region 801 and a dynamic region 802. The static region 801 include the main processor 201 and is fixed in it process flow and circuitry to execute the process tasks assigned to it. The dynamic region 802 includes programmable logic that can be reconfigured in hardware, e.g., changing word widths on buses therein, changing the tasks that are performed by changing hardware configurations. The dynamic region 802 can include the security circuitry 203, the processors 235, the IP cores 335 and the like as described herein. The static region 801 and the dynamic region 802 can be formed on a single substrate 206 or encapsulated in a single package. A plurality of pins 805 extend outside of the package to provide electrical communication to and from the packaged integrated circuit.

Figure 9:
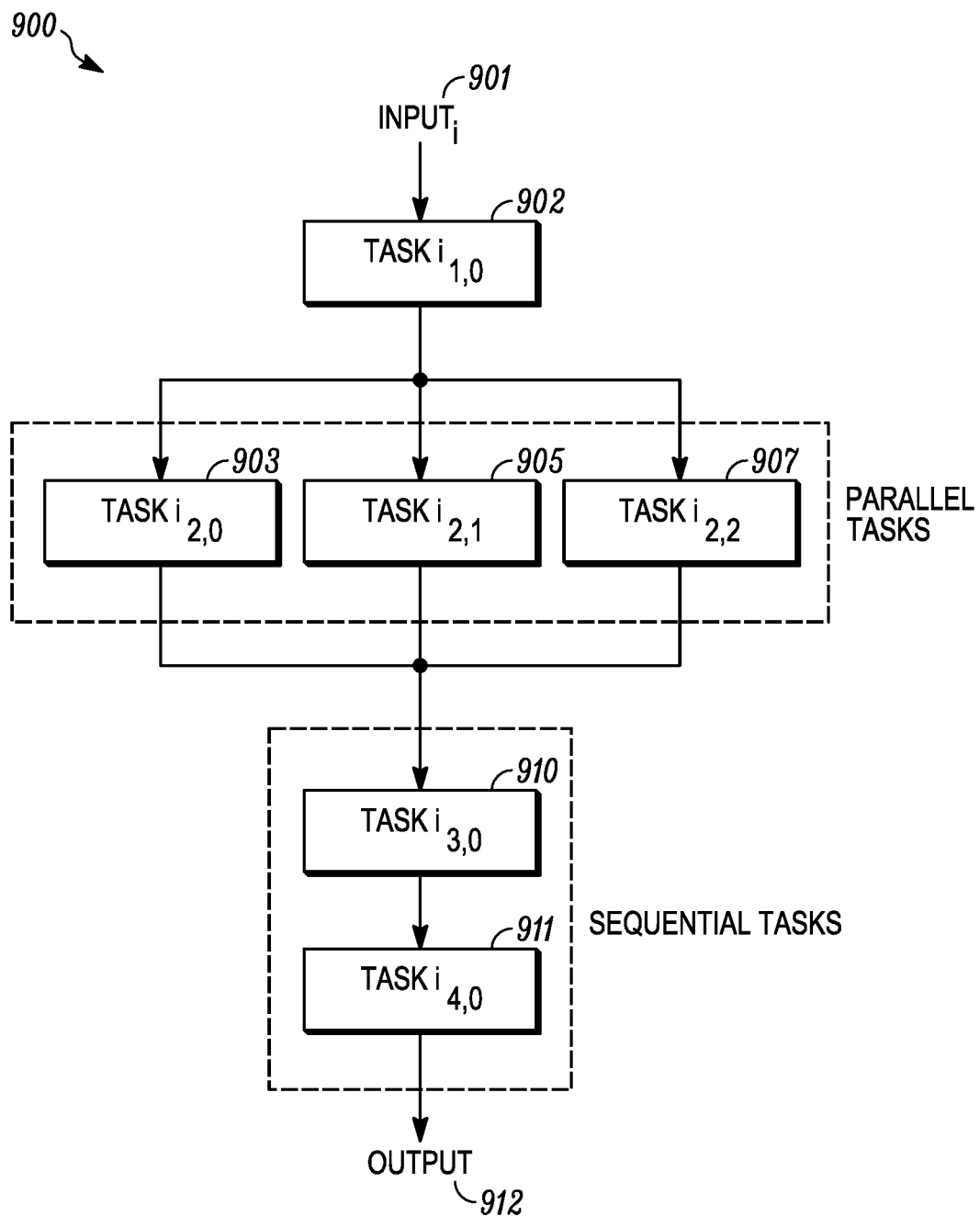
FIG. 9 shows a processing method according to an example embodiment.

FIG. 9 shows a processing method 900 according to an example embodiment. At 901, an input is received, e.g., at the main processor 201. A processing task 902 is carried out by the main processor. The main processor requires some encrypted information and requests the information to be decrypted by the security circuitry. At 903, the main processor 201 can execute a second processing task. At 905, the security circuitry 203 performs decryption on the requested data in parallel to the processing task 903 at the main processor. At 907, the security circuitry 203 can perform another processing task in parallel to the decryption task 905 of the security circuitry 203 and the second processing task 903 of the main processor. Optionally, the additional processing task 907 can be decompression or authentication of the encrypted data. The additional processing task 907 can be processing of other data, e.g., decryption, encryption, authentication, compression, decompression, etc. At 910, the data from the security processor is available to the main processor, which sequentially processes the tasks 910 and 912 to provide an output 912. Thus, the present method 900 can provide parallel processing with the security circuitry and the main processor with the main processor operating sequentially.

While the processing tasks between the main processor and the security circuitry are show to the in parallel, it is within the scope of the present disclosure to have parallel processing within the security circuitry as well. The security circuitry can have multiple processing cores, e.g., reconfigurable IP-cores. A first core cam be performing a first task in parallel to second, third, . . . N cores performing other functions. In an example, the first core can be decrypting an encrypted file, e.g., a first block of the file. The other cores can be preforming other functions, e.g., decrypting another file or another block of the file, authenticating another file, decompressing or compressing a file or the like. The other cores may also be under a reconfiguration task, which can be controlled by a decrypted file and the reconfiguration controller. In another example embodiment, the first core can be decrypting a binary file, e.g., one block at a time. At least one other core can be reconfigured using the decrypted block(s) as the blocks are decrypted by the first core.

Figure 10:
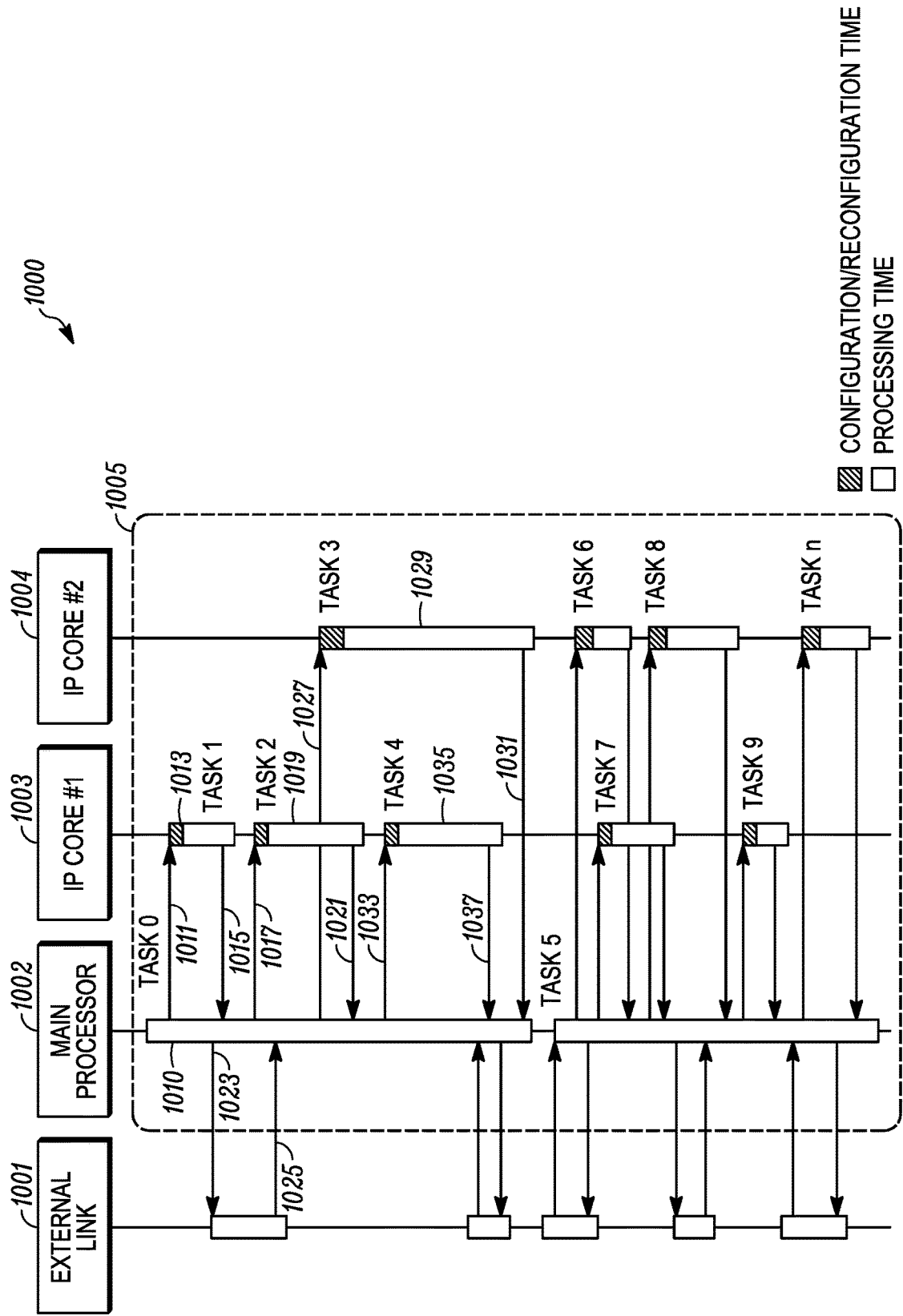
FIG. 10 shows a processing method according to an example embodiment.

FIG. 10 shows a timing diagram 1000 of an external link 1001, the main processor 1002, and two IP cores 1003, 1004. The external link 1001 can be a communication channel or device that is off the shared substrate 1005 on which the main processor 1001 and IP cores 1003, 1004 are formed. The external link 1001 can be the physical layers, off vehicle servers or other electronic devices or units on the vehicle. The main processor 1002 can include any of the main processor functions or structures described herein. The main processor 1002 may be part of the static region 801 in the substrate 206 with reference to FIG. 8. The IP cores 1003, 1004 are part of the security circuitry 203 and include reconfigurable hardware. The IP cores 1003, 1004 may be part of the reconfigurable region 802 in the substrate 206 with reference to FIG. 8.

The main processor 1002 performs Task 0 at 1010. The Task 0 may include a plurality of operations that are preformed sequentially in the main processor 1002, e.g., by loading software into the processor. At a subsequent time, the main processor 1002 issues a data request 1011 for data that must be processed by the security circuitry, which is received at the first IP core 1003. The first IP core 1003 is configured or reconfigured for a first time period to perform Task 1 1013. The first IP core 1003 performs Task 1 and then signals 1015 that the data is ready to main processor 1002. The main processor 1002 can use the data while performing Task 0.

At a subsequent time, the main processor 1002 issues a second data request 1017 for data that must be processed by the security circuitry, which is received at the first IP core 1003. The first IP core 1003 is configured or reconfigured for a second time period to perform Task 2 1019. The first IP core 1002 performs Task 2 1019 and then signals 1021 that the data is ready to main processor 1002. The main processor 1002 can use the data while performing Task 0.

While the main processor 1002 is performing Task 0 1010, the main processor 1002 may communicate at 1023 with the external link 1001, e.g., sending data output or issuing a request for data to the external link 1001. The external link 1001 may process the communication from the main processor and provide a reply communication at 1025. As shown these communications 1023, 1025 occur independently and in parallel to the operation of the IP core 1003 and its Task 1 1013 or Task 2 1019.

During the Task 0 1010 and the Task 2 1019, the main processor 1002 issues another request 1027 for data. The first IP core 1003 is still performing Task 2 1019, thus the request 1027 begins Task 3 1029 at the second IP core 1004. The second IP core 1004 is configured or reconfigured for a first time period to perform Task 3 1027. The second IP core 1004 performs Task 3 1029 and then signals 1031 that the data is ready to main processor 1002. The main processor 1002 can use the data while performing Task 0. The second IP core 1004 performs Task 3 1029 while the main processor 1002 continues to process Task 0 1010 and while the first IP core 1003 is performing Task 2 1019 and Task 4 1035.

It will be understood from the remainder of the timing diagram 1000 that the main processor 1002 can communicate with the external link 1001 during the communication and processing of Tasks by the reconfigurable IP cores 1003, 1004. The main processor 1002 can also request or command that multiple IP cores 1003, 1004 process data, e.g., decrypt, encrypt, authenticate, decompress, compress and the like, in parallel.

The present structures and methods provide adaptive security architecture with a hardware Root-of-Trust, e.g., message signature generation and handling of private keys only in secure hardware, storage of certificates only encrypted and only decrypted within secure hardware. The hardware, e.g., the processors 235, 335, can also provide hardware-based firewall services. The processors 235, 335 can also provide PUF-based key generation and storage.

The present structures and methods provide adaptive security architecture with a hardware Root-of-Trust, e.g., message signature generation and handling of private keys only in secure hardware, storage of certificates only encrypted and only decrypted within secure hardware. The hardware, e.g., the processors 235, 335, can also provide hardware-based firewall services. The processors 235, 335 can also provide PUF-based key generation and storage.

The processors 235, 335 can provide an intrusion detection system (IDS) to monitor inbound and outbound communication activity on the bus 210 or into and out of the ECU 104 or system 300 by identifying any suspicious patterns that may indicate a network or system attack from data attempting to break into or compromise a system of the vehicle. In an example, the processors 235, 335 can stop a function once the IDS detects a possible intrusion and may self-reconfigure themselves in case of detection of intrusion. The processors 235, 335 can further provide secure authentication and privacy, e.g., challenge-response authentication, digital signature or fingerprint, and authorize secure flashing including over the air updating.

In an example, all of the data stored of the substrate 201, 203, 304 or in the external memories 360, 361 are stored encrypted. The processors 235, 335 can decrypt the needed data in real time, on-demand, on the fly when required, thanks to the high throughput delivered by the described structures, e.g., using hardware parallelism.

The use of a hardware based encryption and decryption circuitry 235 is believed to provide a high level of security, i.e., higher than software based security. Software security solutions may be more vulnerable to attacks than the presently described hardware security solutions. The present hardware based systems and methods can provide roots of trust (RoT), including a set of functions in the trusted computing module that is always trusted by the computer's operating system, e.g., the controller 201. The circuitry 203 may serve as separate compute engine operating as a trusted computing platform cryptographic processor on the vehicle, computer or mobile device in which the circuitry 203 is embedded. The circuitry 203 can provide on the fly drive encryption, detection and reporting of unauthorized changes to the operating system or programs, detection of rootkits, and prevent programs from inappropriately reading from or writing to another program's memory, and hardware-based digital rights management (DRM) support, and the like.

The present disclosure describes structures that implement cryptographic functionality in V2X applications. The performance of existing electrical systems does not allow such functionality as described herein. Therefore, these solutions provide a step forward in the automotive arena.

The separation of the main controller, which can include a processor, and the reconfigurable area that can implement security structures provides the ability to provide parallel processing with the normal operation of the controller and the security features. Any of the IP cores in the reconfigurable area may be reconfigured to other functionality according to given vehicle environmental or communication conditions. This reconfiguration may occur according to given run-time processing needs identified by main controller. Moreover, the reconfigurable area may use its multiple reconfigurable cores to provide parallel processing within the reconfigurable area. For example, the reconfigurable area can use separate devices to received data, decrypt data and update (e.g., reconfigure) an IP core at the same time. For example, a first block of a binary file is received and decrypted. This first block may be used to begin reconfiguring an IP core, while other IP cores are receiving and decrypting subsequent blocks of the binary file.

The present disclosure provides for parallel processing using two processors with one handling the tasks assigned to the electronic unit and the other handling the processing intensive (time and possibly number of functions or actions) encryption/decryption and in some embodiments, decompression/compression. To increase security, both processors, a connecting bus and memory may be formed on a single piece of integrated circuit substrate. This makes it more difficult for nefarious actors to monitor actions of the processors by monitoring signals, heat, current levels, electromagnetic radiation and the like. The first processor may include a plurality of cores, which are in charge of managing functions in software. The other processor may include multiple field programmable cores, which are in charge of managing functions in hardware. The encryption/decryption processor is reconfigurable so that it need not be replaced if the current hardware algorithm for encryption/decryption is no longer valid. Moreover, the other processor does not merely load software instructions but reconfigures its hardware to execute its encryption/decryption algorithm. In an example, to update the encryption/decryption to provide an improved security function(s), e.g., to prevent a loss of trust zone hacking attack, the system receives a binary file. The binary file includes some instruction for the cores and specifications for the connections in the circuitry of encryption/decryption processor.

The present disclosure refers to a vehicle. A vehicle, in an example embodiment, is an automobile, both with an internal combustion engine, a hybrid, an electric motor, or an alternative fuel powered vehicle. A vehicle may also include trucks, military vehicles, aircraft, boats, ships, watercraft and the like.

While the present disclosure is generally directed to vehicle applications, the present disclosure can be used in other fields, which rely on downloaded software, data or instructions, e.g., smartphones or smart cards and credit cards, where security/privacy and data compression protocols are necessary.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. A vehicle electronic control unit, comprising:
   a memory configured to store encrypted and unencrypted vehicle data;
   a main processor operatively connected to the memory and configured to access unencrypted vehicle data stored in the memory, the main processor further configured to process unencrypted vehicle data to perform tasks assigned to the electronic control unit;
   a security processor operatively connected to the memory and configured to access encrypted and unencrypted vehicle data stored in the memory, the security processor further configured to encrypt unencrypted vehicle data stored in the memory and store the encrypted vehicle data in the memory and to decrypt encrypted vehicle data stored in the memory and store the decrypted vehicle data in the memory as unencrypted vehicle data for accessing and processing by the main processor, the security processor executing encryption and decryption in hardware circuitry that is field programmable; and
   a substrate in which is defined a bus to connect the main processor, the memory, and the security processor;
   wherein the encryption of unencrypted vehicle data or decryption of encrypted vehicle data by the security processor is performed in parallel to processing by the main processor of unencrypted vehicle data to perform the tasks assigned to the electronic control unit;
   wherein the security processor includes an IP core configured to produce a security counter measure at run-time to side-channel attacks against the vehicle electronic control unit, and wherein the IP core senses current drawn by the main processor and the security processor and consumes current to maintain a current on the substrate to reduce sensing operation of the security processor and the main processor.

2. The vehicle electronic control unit according to claim 1, wherein the security processor includes a plurality of IP cores that include reconfigurable circuitry to assign at least one of the plurality of IP cores a task for encryption or decryption.

3. The vehicle electronic control unit according to claim 2, wherein one of the plurality of IP cores includes circuitry configured for data decompression and data compression.

4. The vehicle electronic control unit according to claim 2, wherein the IP cores operate as finite state machines that run in parallel with the main processor.

5. The vehicle electronic control unit according to claim 1, wherein the security processor is configurable to a new encryption scheme by reconfiguring hardware.

6. The vehicle electronic control unit according to claim 2, wherein one of the plurality of IP cores is configured to produce security counter measures at run-time to side-channel attacks against the vehicle electronic control unit.

7. The vehicle electronic control unit according to claim 2, wherein the main processor and at least one IP core engage in vehicle to vehicle communication with connections that cause a delay resulting in a connection failure of at least one of the connections and at least one additional one of the IP cores is configured to authenticate the vehicle to vehicle communications in parallel to the main processor when a delay to fail occurs during run-time.

8. The vehicle electronic control unit of claim 2, wherein the main processor receives a command that a cryptographic code is compromised, the main processor enters a secure mode where no critical operations are allowed from received data until a specific secure connection is established and the cryptographic code is upgraded in the security circuitry.

9. The electronic control unit of claim 1, wherein the main processor, after confirmation of successful upgrade of encryption/decryption algorithms by the security processor, sends the same hardware algorithm upgrade to a second electronic control unit in a vehicle so that the hardware encryption-decryption algorithm is also upgraded in the second electronic control unit.

10. An electronic control unit, comprising:
a memory configured to store encrypted data and unencrypted data;
a main control unit operatively connected to the memory and configured to access unencrypted data stored in the memory, the main control unit further configured to process unencrypted data to perform tasks not related to authentication; and
a hardware encryption-decryption device operatively connected to the memory and configured to access encrypted data stored in the memory for decryption using a hardware algorithm and to access unencrypted data stored in the memory for encryption using the hardware algorithm;
wherein encrypted data stored in the memory is decrypted by the hardware encryption-decryption device using the hardware algorithm and stored in the memory as unencrypted data for accessing and processing by the main control unit to perform the tasks,
wherein unencrypted data stored in the memory is encrypted by the hardware encryption-decryption device using the hardware algorithm and stored in the memory as encrypted data by the hardware encryption-decryption device, and
wherein the main control unit and the hardware encryption-decryption device are separate integrated circuits on a single substrate with a bus connecting the memory with the main control unit and the hardware encryption-decryption device and wherein the encryption of unencrypted data or decryption of encrypted data by the hardware encryption-decryption device is performed in parallel to processing by the main control unit of unencrypted data to perform the tasks;
wherein the security processor includes an IP core configured to produce a security counter measures at run-time to side-channel attacks against the main control unit, and wherein the IP core produces acoustic information to mask operation of the main control unit and the hardware encryption-decryption device.

11. The electronic control unit of claim 10, wherein hardware encryption-decryption device includes a field programmable device or programmable logic.

12. The electronic control unit of claim 11, wherein the main control unit receives a hardware algorithm update in a compressed, encrypted data file, sends the hardware algorithm update to the memory, and the field programmable device decompresses and decrypts the hardware algorithm update, wherein the hardware encryption-decryption device uses the decrypted hardware update to update the hardware algorithm in the hardware encryption-decryption device while the main control unit processes other software tasks.

13. The electronic control unit of claim 10, wherein the hardware encryption-decryption device includes a reconfigurable memory in the form of a flash memory or a random access memory.

14. The electronic control unit of claim 10, wherein the hardware encryption-decryption device includes a field programmable gate array.

15. The electronic control unit of claim 14, wherein the main control unit receives an update for the hardware algorithm in the field programmable gate array.

16. The electronic control unit of claim 15, wherein the update is a new cryptography algorithm in run-time.

17. The electronic control unit of claim 15, wherein the hardware encryption-decryption device includes a plurality of IP cores, and wherein the update is to erase at least one of the IP cores and install a new hardware algorithm.

18. The electronic control unit of claim 15, wherein the hardware encryption-decryption device includes a plurality of IP cores, and wherein the update is to add a further IP core to the hardware algorithm in the hardware encryption-decryption device.

19. The electronic control unit of claim 15, wherein the hardware encryption-decryption device includes a plurality of IP cores, and wherein the update is to remove an IP core from hardware placement in the hardware encryption-decryption device.

20. The electronic control unit of claim 15, wherein the hardware encryption-decryption device includes a plurality of IP cores, and wherein the update is to change specific processing of an IP core in run-time with other processors operating in parallel.

21. The electronic control unit of claim 10, wherein the hardware encryption-decryption device is reconfigured for a new process while the main control unit continues to process other data.

22. A vehicle electronic control unit, comprising:
a memory configured to store encrypted and unencrypted vehicle data;
a main processor operatively connected to the memory and configured to access unencrypted vehicle data stored in the memory, the main processor further configured to process unencrypted vehicle data to perform tasks assigned to the electronic control unit;
a security processor operatively connected to the memory and configured to access encrypted and unencrypted vehicle data stored in the memory, the security processor further configured to encrypt unencrypted vehicle data stored in the memory and store the encrypted vehicle data in the memory and to decrypt encrypted vehicle data stored in the memory and store the decrypted vehicle data in the memory as unencrypted vehicle data for accessing and processing by the main processor, the security processor executing encryption and decryption in hardware circuitry that is field programmable; and
a substrate in which is defined a bus to connect the main processor, the memory, and the security processor;
wherein the encryption of unencrypted vehicle data or decryption of encrypted vehicle data by the security processor is performed in parallel to processing by the main processor of unencrypted vehicle data to perform the tasks assigned to the electronic control unit;
wherein the security processor includes an IP core configured to produce a security counter measure at run-time to side-channel attacks against the vehicle electronic control unit, and wherein the IP core produces current in a random pattern to mask currents to and from the main processor and the security processor.

23. The vehicle electronic control unit of claim 22, wherein the security processor includes a plurality of IP cores that include reconfigurable circuitry to assign at least one of the plurality of IP cores a task for encryption or decryption, and wherein the main processor receives a command that a cryptographic code is compromised, the main processor enters a secure mode where no critical operations are allowed from received data until a specific secure connection is established and the cryptographic code is upgraded in the security circuitry.

24. A vehicle electronic control unit, comprising:
a memory configured to store encrypted and unencrypted vehicle data;
a main processor operatively connected to the memory and configured to access unencrypted vehicle data stored in the memory, the main processor further configured to process unencrypted vehicle data to perform tasks assigned to the electronic control unit;
a security processor operatively connected to the memory and configured to access encrypted and unencrypted vehicle data stored in the memory, the security processor further configured to encrypt unencrypted vehicle data stored in the memory and store the encrypted vehicle data in the memory and to decrypt encrypted vehicle data stored in the memory and store the decrypted vehicle data in the memory as unencrypted vehicle data for accessing and processing by the main processor, the security processor executing encryption and decryption in hardware circuitry that is field programmable; and
a substrate in which is defined a bus to connect the main processor, the memory, and the security processor;
wherein the encryption of unencrypted vehicle data or decryption of encrypted vehicle data by the security processor is performed in parallel to processing by the main processor of unencrypted vehicle data to perform the tasks assigned to the electronic control unit;
wherein the security processor includes an IP core configured to produce security counter measures at runtime to side-channel attacks against the vehicle electronic control unit, and wherein the IP core outputs random electromagnetic radiation to mask operation of the main processor and the security processor.

25. The vehicle electronic control unit of claim 24, wherein the security processor includes a plurality of IP cores that include reconfigurable circuitry to assign at least one of the plurality of IP cores a task for encryption or decryption, and wherein the main processor receives a command that a cryptographic code is compromised, the main processor enters a secure mode where no critical operations are allowed from received data until a specific secure connection is established and the cryptographic code is upgraded in the security circuitry.

* * * * *